United States Patent [19]
Kangas et al.

[11] Patent Number: 5,582,656
[45] Date of Patent: Dec. 10, 1996

[54] FERRITIC-AUSTENITIC STAINLESS STEEL

[75] Inventors: Pasi Kangas; Bertil Waldén, both of Gävle; Göran Berglund, Sandviken; Michael Nicholls, Järbo, all of Sweden

[73] Assignee: Sandvik AB, Sandviken, Sweden

[21] Appl. No.: 262,942

[22] Filed: Jun. 21, 1994

[30] Foreign Application Priority Data

Jun. 21, 1993 [SE] Sweden ................... 9302139

[51] Int. Cl.⁶ .................................. C22C 38/44
[52] U.S. Cl. ........................... 148/325; 148/327
[58] Field of Search .................... 148/325, 327

[56] References Cited

U.S. PATENT DOCUMENTS

| | | | |
|---|---|---|---|
| 4,832,765 | 5/1989 | DeBold et al. | 148/325 |
| 5,238,508 | 8/1993 | Yoshitake et al. | 148/325 |
| 5,284,530 | 2/1994 | Azuma et al. | 148/327 |

FOREIGN PATENT DOCUMENTS

| | | |
|---|---|---|
| 89943 | 9/1983 | European Pat. Off. |
| 4-198456 | 7/1992 | Japan . |

*Primary Examiner*—Deborah Yee
*Attorney, Agent, or Firm*—Burns, Doane, Swecker & Mathis, L.L.P.

[57] ABSTRACT

A duplex stainless steel alloy has been provided which contains in % by weight:
—C max. 0.05
—Si max. 0.8
—Mn 0.3–4
—Cr 28–35
—Ni 3–10
—Mo 1.0–4.0
—N 0.2–0.6
—Cu max. 1.0
—W max. 2.0
—S max 0.010
—Ce 0–0.2 the remainder being Fe and normally occurring impurities and additives. The ferrite content is 30–70% by volume, balance austenite. The steel alloy is very suitable in the environments that exist at the production of urea, in which it may advantageously replace the austenitic steels used so far.

15 Claims, 3 Drawing Sheets

FERRITIC-AUSTENITIC STAINLESS STEEL

BACKGROUND OF THE INVENTION

The present invention relates to a ferritic-austenitic steel with a high content of Cr and N and a low content of Ni, primarily intended for high-pressure components in plants for the synthesis of urea. However, it is also suited for other purposes where good corrosion resistance or high strength is required.

Duplex stainless steels are steels characterized by a ferritic-austenitic structure, where the two phases have different compositions. Modern duplex stainless steels are mainly alloyed with Cr, Mo, Ni and N. The duplex structure means that Cr and Mo will be enriched in the ferrite and Ni and N in the austenite. Most of the modern duplex steels contain 22–27% Cr, 4–7% Ni, 0–4% Mo and 0.1–0.3% N. This gives the materials a duplex structure with 30–70% ferrite and the rest austenite. Other elements, such as Mn, Cu, Si and W, also occur in order to give the alloys special properties.

Duplex stainless steels are often used as alternatives to austenitic stainless steels, at a lower price, due in part to the lower Ni content in duplex stainless steels. Thus, it is often possible to find a duplex stainless steel with a corrosion resistance corresponding to the austenitic stainless steel. An example of this is the austenitic 254 SMO® (UNS S 31254), with 20% Cr, 18% Ni, 6% Mo and 0.2% N, which has a corrosion resistance in chloride-containing environments of the same level as the duplex steel SAF 2507® (UNS S 32750), with 25% Cr, 7% Ni, 4% Mo and 0.3% N.

However, some austenific steels, such as Sandvik 2RE69, which was developed specially for use in urea processes, with 25% Cr, 22% Ni and 2% Mo, has so far lacked an adequate correspondence in duplex stainless steels for use in urea processes. This problem has been solved by the present invention.

The alloying levels in duplex stainless steels are restricted at their upper levels by the structure ability. The ferritic-austenitic structure implies that the material is sensitive to embrittlement at 475° C. and separation of intermetallic phase in the temperature range of 600°–1000° C. Separation of the intermetallic phase is enhanced primarily by high contents of Cr and Mo but it can be suppressed by the inclusion of N. The effect of N on structural stability means that higher contents of Cr may be alloyed into the material without any deterioration of the structural stability. However, the N-content is limited upwards by its solubility in the melt, which gives rise to porosity at too high percentages, and by the solid solubility in the alloy, which may cause nitride precipitation.

In order to increase the solubility of N in the melt, the Mn and Cr contents may be increased. However, Mn increases the risk for separation of intermetallic phase, so the Mn content should be restricted. Since N is a strong austenite promoter, the Ni content can be lowered considerably by an increased N content while still maintaining a ferritic-austenitic structure.

Plants for the synthesis of urea constitute an interesting application for austenitic and duplex stainless steels. Urea is produced by a synthesis of ammonia and carbon dioxide under high pressure and high temperature. The process solution in the high-pressure part is very corrosive towards carbon steels. Therefore, special steels are used to a large extent, but also titanium and zirconium are used. However, the latter are very costly in purchase and manufacture, thus restricting their use.

Austenitic stainless steels dominate today as materials used as components in the high-pressure part of the urea process. A frequently occurring steel is Sandvik 3R60R U.G., which is modified AISI 316L (UNS S 31603) containing (nominally) 18% Cr, 14% Ni and 2.7% Mo and a carefully controlled ferrite content. In the most demanding applications, steels of the type 25% Cr-22% Ni-2% Mo (UNS S 31050) are used. A requirement for the use of stainless steels is that the passivity of the steel can be maintained. Therefore, oxygen is added to the process solution in the urea synthesis. Thus, this addition is only necessary because of a material-technical point of view, while however simultaneously causing energy and yield losses, as well as a potential safety risk at too high contents. Therefore, out of a process-technical point of view, there is a desire to reduce the addition of oxygen, if possible completely eliminating it. However, in today's processes it is difficult to guarantee that the required amount of oxygen be present in the process solution. This is the case at, e.g., the boiling of the solution, which takes place in the stripper, this being the most critical heat exchanger. Some corrosion also occurs on steels of the type Cr25-Ni22-Mo2 (UNS S 31050) under certain conditions. Corrosion on AISI 316L (UNS S 31603) mainly takes place under condensing conditions. Thus, adequate passivity cannot be upheld in all parts of the process.

Inferior material quality also causes corrosion in the urea process, which results in attacks in connection to welded parts. Inhomogeneous material is another reason for corrosion. These factors show that good structural stability is a prerequisite for good corrosion endurance in the urea solution, or at other applications where good corrosion endurance is required.

In relation with the composition of steels used in urea process components, it is well known that Cr has a beneficial influence on the corrosion resistance. A number of investigations has also shown that Ni in austenitic steels is detrimental under conditions when low contents of oxygen occur in the process solution. This results in a pronounced increase of the corrosion speed with increasing content of Ni in the steel. On the other hand, ferritic steels containing low contents of Ni have a very low corrosion under these conditions. However, the ferritic steels have large limitations as a construction material because of bad structural stability, which results in problems in connection with welding and manufacturing.

Ferritic-austenitic stainless steels are very interesting in view of several aspects, primarily as a material in the urea process. The high strength of these steels can be well used in the high-pressure part, and the moderate nickel content gives this steel type a better resistance to corrosion under oxygen-free conditions. Thus, a ferritic-austenitic steel should have a high Cr content and a low Ni content in order to have a good resistance in a urea environment at oxygen free conditions.

OBJECTS AND SUMMARY OF THE INVENTION

It is an object of this invention to avoid or alleviate the problems of the prior art.

It is further an object of this invention to provide a duplex ferritic-austenitic stainless steel which provides a good operating material under urea processing conditions as well as other corrosive conditions.

In one aspect of the invention there is provided a stainless steel alloy having a ferrite-austenite duplex microstructure containing, in % by weight:

—C max. 0.05
—Si max. 0.8
—Mn 0.3–4
—Cr 28–35
—Ni 3–10
—Mo 1.0–4.0
—N 0.2–0.6
—Cu max. 1.0
—W max. 2.0
—S max 0.010
—Ce 0–0.2 the remainder being Fe and normally occurring impurities and additives, the ferrite content being 30–70% by volume, balance austenite.

In another aspect of the invention there is provided in the production of urea, including the use of stainless steel components for high-pressure components subject to contact with urea or its precursors, the improvement comprising using the alloy of claim 1 for at least a portion of the components.

The alloy may also be used as construction materials or components in the production of nitric acid, in the pulp and paper industry or as welding wire.

DETAILED DESCRIPTION OF THE PREFERRED EMBODIMENTS OF THE INVENTION

Figure 1:
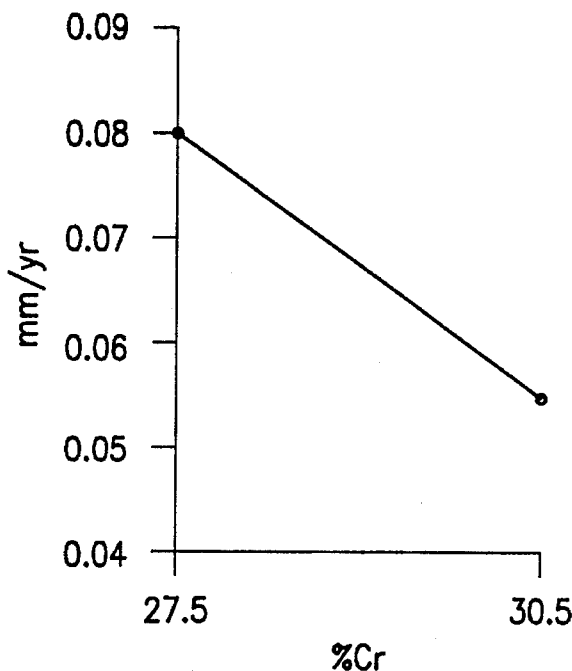
FIG. 1 shows the influence of Cr on the corrosion according to the Huey test.
Figure 2:
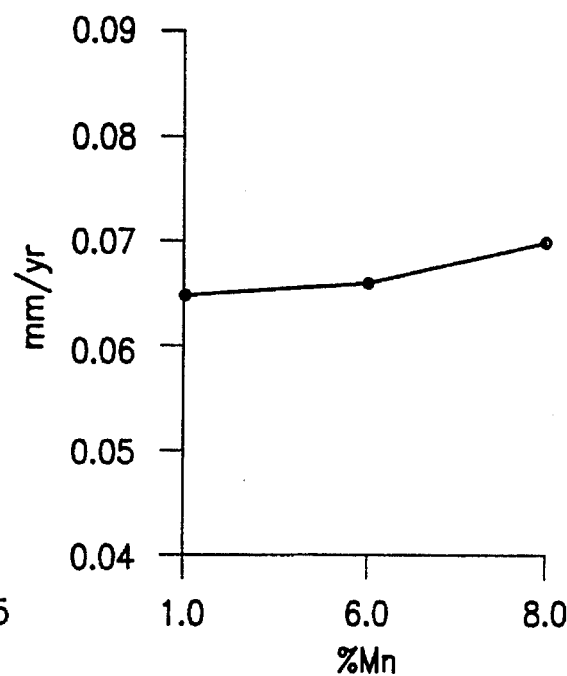
FIG. 2 shows the influence of Mn on the corrosion according to the Huey test.
Figure 3:
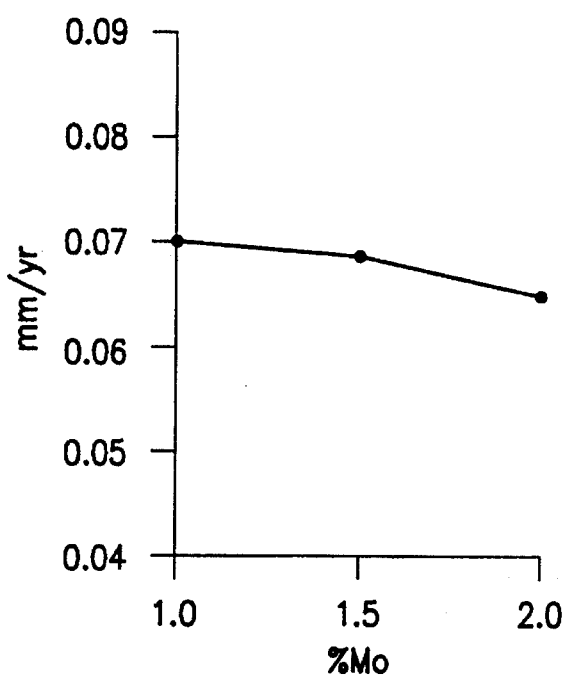
FIG. 3 shows the influence of Mo on the corrosion according to the Huey test.
Figure 4:
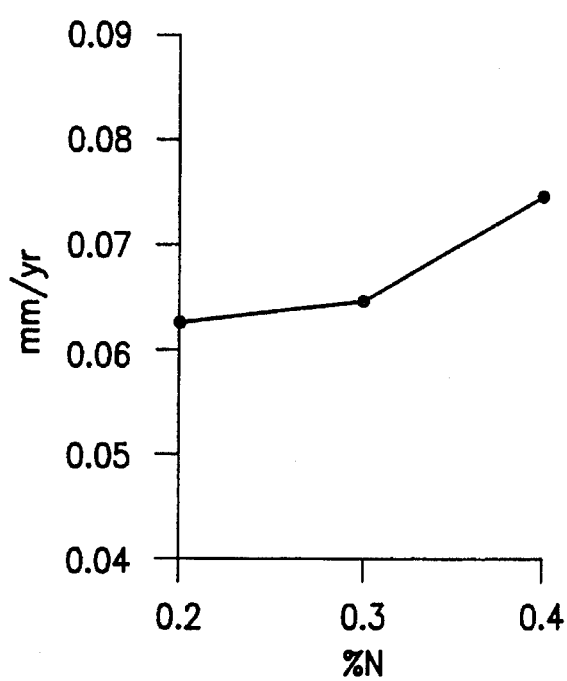
FIG. 4 shows the influence of N on the corrosion according to the Huey test.
Figure 5:
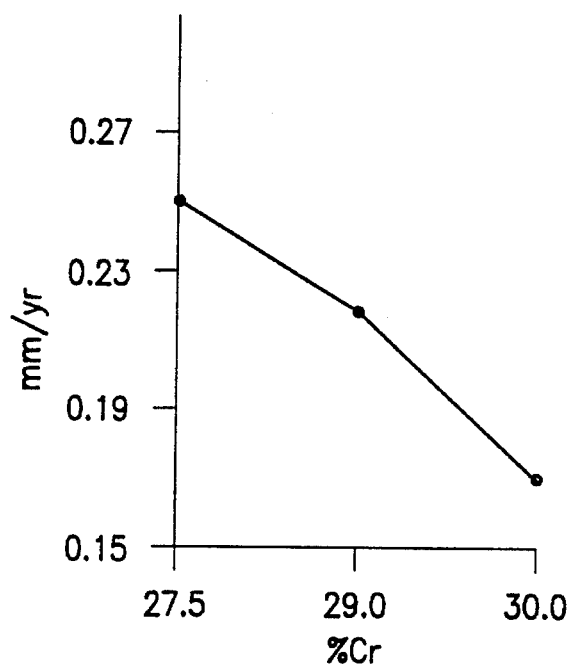
FIG. 5 shows the influence of Cr on the corrosion according to the Streicher test.
Figure 6:
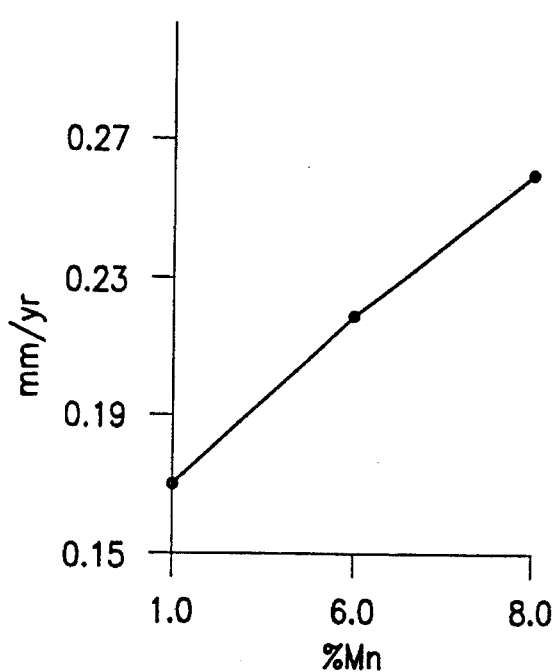
FIG. 6 shows the influence of Mn on the corrosion according to the Streicher test.
Figure 7:
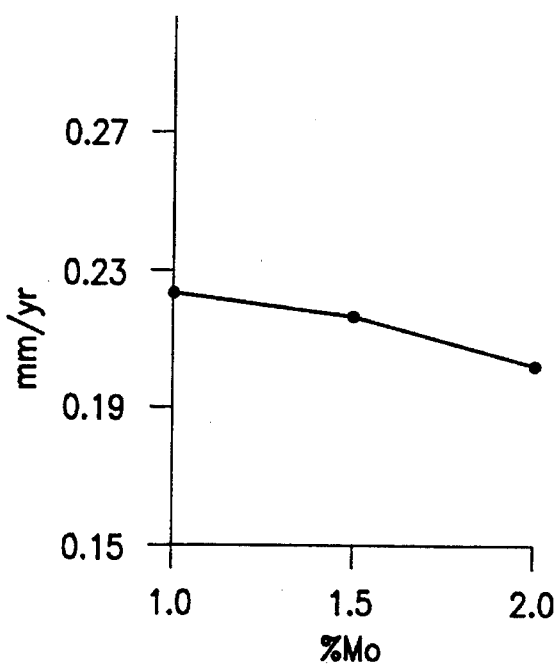
FIG. 7 shows the influence of Mo on the corrosion according to the Streicher test.
Figure 8:
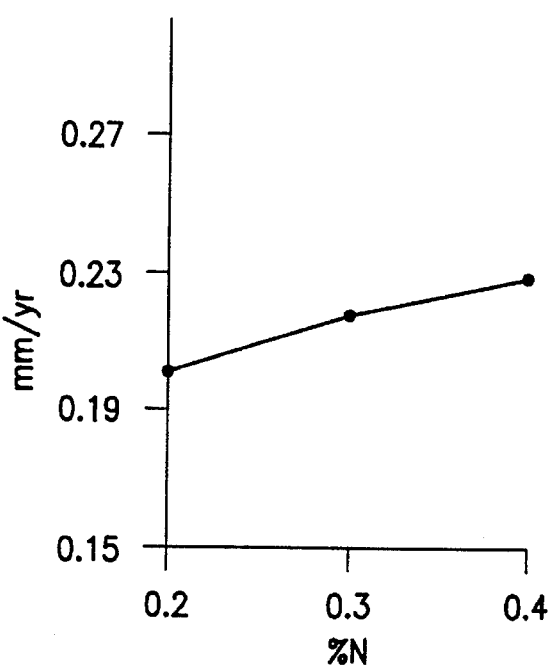
FIG. 8 shows the influence of N on the corrosion according to the Streicher test.

The present invention relates to a duplex ferritic-austenitic steel with a high content of Cr and N and a low content of Ni, primarily intended for high pressure parts in the urea synthesis, but which may also find applications in other environments where high-alloy austenitic stainless steels are used for attaining corrosion resistance. Particularly good properties have been obtained in the following applications:
—stripper tubes in urea plants
—ferrules in urea plants
—condensation tubes in urea plants
—welded-on materials in urea plants
—high pressure tubes in urea plants
—nitric acid process (e.g., in the cooler-condenser)
—paper and pulp industry (e.g., in white liquor environment)
—welding wire Other suitable applications for the steel alloy according to the invention are as manufacturing material for seamless tubes, welded tubes, flanges, couplings and sheet-metal.

The alloy is characterized by good structural stability, which has been attained at the high Cr content by the inclusion of high contents of N.

The alloy contains in % by weight:
—C max. 0.05
—Si max. 0.8
—Mn 0.3–4
—Cr 28–35
—Ni 3–10
—Mo 1.0–4.0
—N 0.2–0.6
—Cu max. 1.0
—W max. 2.0
—S max 0.010
—Ce 0–0.2 the remainder being Fe and impurities in normal mounts. Ferrite content: 30–70%, balance austenite.

Carbon is to be considered rather as an impurity element in the present invention and has a limited solubility in both ferrite and austenite. This limited solubility implies that a risk for carbide precipitations exists at too high percentages, with decreased corrosion resistance as a consequence. Therefore, the C-content should be restricted to a maximum of 0.05%, preferably to 0.03% max., and most preferably 0.02% max.

Silicon is used as a deoxidation additive in steel manufacture and increases the flowability during production and welding. Too high Si contents increase the tendency for precipitations of intermetallic phases and decreases the solubility of N. For this reason the Si content should be restricted to 0.8% max., preferably 0.5% max.

Manganese is added to the alloy to increase the solubility of N in the melt and for replacing Ni as an alloying element, since Mn is considered to be austenite-stabilizing. Investigations which are described below show that Mn influences the corrosion resistance negatively and, moreover, deteriorates the structural stability, which results in a greater risk of precipitations of intermetallic phase. However, alloying with Mn has anyway been considered as advantageous due to increased solubility of N and a possibility of lower contents of Ni with maintained ferrite content. However, it has surprisingly been shown that Mn has a negligible austenite-stabilizing effect. Without being bound by any theoretical relations, it is believed that the high N content redistributes Mn from the austenite to the ferrite, so that the Mn content differs insignificantly between ferrite and austenite when the N content is high. Moreover, it has been shown that at the Cr contents in question in the alloy, the N solubility in the melt is so high that it does not motivate any alloying of Mn to any high degrees. Suitably, a Mn content of between 0.3 and 4% b.w. is chosen, preferably between 0.3 and 2% b.w.

Chromium is the most active element for increasing the resistance against most types of corrosion. For use in urea synthesis, the Cr content is of great importance for the resistance so the Cr content should be maximized as far as possible from a structural stability point of view. An increase of the Cr content implies that the ferrite, which always has a higher Cr content than the austenite will be sensitive to precipitations to too high Cr percentages, which implies that precipitation, mainly of intermetallic phase, may happen in the ferrite and at ferrite-ferrite and ferrite-austenite grain borders. Therefore, it is desirable to redistribute Cr from the ferrite to the austenite so that the weaker austenite gets increased resistance, and that a higher total amount of Cr can be alloyed in without deteriorating the structural stability. Furthermore, Cr increases the solubility of N in the melt and the solid solubility of N in the alloy. At a sufficiently high Cr content, the melt production is also enhanced by the fact that it is then also possible to add all the nitrogen in the AOD (Argon Oxygen Decarburization), which implies that the addition of expensive Fe-Cr-N at the ladle treatment can be dispensed with. In order to attain sufficient corrosion resistance in the austenite, the Cr content should be at least 25%, preferably at least 27%, in the austenite phase. Therefore, a total Cr content of at least 28% is desirous, preferably at least 29%. However, in the combination with Mo, W, Si and Mn, chromium increases the risk of precipitations of intermetallic phase, wherefore the Cr content should be limited to 35% max., preferably 33% max.

Nickel is mainly used as an austenite stabilizing element and according to the present invention its content should be kept as low as possible. An important reason for the bad resistance of austenitic stainless steels in urea environments with low contents of oxygen is supposed to be their relatively high content of Ni. The lower content of Ni in ferritic-austenitic stainless steels is assumed to be a primary reason for the better resistance of this type of alloy in urea environments with low oxygen contents. Alloying with N implies that lower contents of Ni may be added with maintained content of ferrite. However, the Ni content in the austenite phase is restrictive for the resistance in a urea environment. The Ni content is higher in the austenite phase than in the ferrite phase. Investigations described below surprisingly show that an increase of the N content not only makes possible a decrease of the Ni content, but also implies that the Ni is redistributed from the austenite phase to the ferrite phase. Thus, this means a further improved resistance in urea environment, since the weaker austenite phase obtains a lower Ni content than expected when the N content was increased. In the present invention a content of 3–10% Ni is required, preferably 3–7% Ni, in order to attain a ferrite content in the range 30–70%.

Molybdenum is a very active element and is used to improved the passivity of the alloy. Mo together with Cr and N are those elements that most effectively increase the resistance against pitting and crevice corrosion. Investigations described below surprisingly show that an increasing Mo content in the alloy according to the present invention improves the resistance in corrosive environments, which results in a decreased corrosion in the Huey tests when the Mo content is increased. Further, Mo diminishes the tendency for precipitations of nitrides by increasing the solid solubility of N. Therefore, a Mo content of at least 1% is desirable. However, too high contents of Mo involve the risk of precipitations by intermetallic phases, especially if at the same time the Cr content is high. Therefore, the Mo content should be limited to 4% max., preferably 3% max., in particular 2% max.

Nitrogen is a very active element in the alloy. N is a strong austenite former and enhances the reconstitution of austenite in the heat influenced zone after welding. N influences the distribution of Cr and Mo so that higher contents of N increase the relative share of Cr and Mo in the austenite. On the one hand, this means that the austenite becomes more resistant to corrosion and on the other hand that higher contents of Cr and Mo may be included into the alloy while the structural stability is maintained, since the share of Cr and Mo in the ferrite, which is more apt to precipitations than austenite, becomes lower at determined percentages of Cr and Mo. Since the austenite phase is the weaker phase in the alloy, this phase will preferentially be attacked in a urea environment. Therefore, inclusion of high N contents is highly advantageous because it decreases the risk for precipitations in the intermetallic phase in the ferrite at the same time as it increases the corrosion resistance. Moreover, it is well known that N suppresses the formation of intermetallic phases, also in wholly austenitic steels. Thus, in duplex steels a lowered sensibility to precipitations is obtained due to element redistribution as well as a decreased sensibility to precipitations due to the nitrogen in itself as an alloying element. Therefore, N should be added to a content of at least 0.20%, preferably at least 0.30%, and in particular at least 0.36%. The upper limit of N content is limited by the solubility in the melt and by the solid solubility in the alloy, which means that precipitation of nitrides may happen at too high N contents. Further, too high contents of N may cause formation of pores at welding. Therefore, the N content should be limited to 0.60% max., preferably 0.55% max.

During welding, nitrogen enhances the reconstitution of austenite which drastically improves the toughness and the corrosion resistance of the weld joint.

Copper improves the general corrosion resistance in acid environments, such as sulfuric acid. However, high contents of Cu decrease the pitting and crevice corrosion resistance. Further, in the alloy type in question the solid solubility of Cu is limited. Therefore, Cu should be restricted to 1.0% max.

Tungsten increases the resistance against pitting and crevice corrosion. However, high contents of W increases the risk for precipitation of intermetallic phases, particularly in combination with high contents of Cr and Mo. Moreover, the inclusion of W results in a more costly handling in the steel plant. Therefore, the amount of W should be limited to 2.0% max.

Sulphur influences the corrosion resistance negatively by the formation of easily soluble sulfides. Furthermore, the hot-workability is deteriorated by high contents of S. Therefore, the content of S should be restricted to 0.010% max., preferably to 0.005% max., in particular to 0.001% max.

Cerium may be added to the alloy, for instance in the form of a misch-metal, in order to improve the hot-workability of the alloy. Contrary to manganese sulfides, Ce forms ceriumoxy-sulfides which do not deteriorate the corrosion resistance. Therefore, Ce may be added to the alloy in percentages up to 0.2% max., preferably 0.1% max. If Ce is added, the content should be at least 0.03%.

The ferrite content of the alloy is important for guaranteeing the phase composition, the structural stability, the hot-workability and the corrosion resistance. Therefore, the ferrite content should be in the range 30–70% by volume, preferably in the range 30–55% b.v., remainder austenite.

The invention aims at providing an alloy with good corrosion properties, primarily in an urea environment. Since Cr is the most effective element for improving the resistance, which is a consequent of the fact that the passivity properties improve with increasing Cr content, the Cr content should be as high as possible. However, at a certain content of Cr the structural stability deteriorates. The reason for this is that the ferritic, having higher contents of Cr and Mo than the austenite, becomes apt to precipitations, whereby mainly intermetallic phases will precipitate in the ferrite, or at the grain borders between ferrite-ferrite or ferrite-austenite. However, by including N into the alloy, Cr and Mo will be redistributed into the austenite phase.

In order to optimize the Cr content in the austenite phase, preferably the following conditions should be fulfilled (as usual, all percentages are % by weight):
% Cr+15·% N>31, in particular>33

In order to further improve the resistance against oxidizing environments, the following condition is advantageously fulfilled:
% Cr +% Mo–8% N>22

In order to minimize the risk of precipitations of intermetallic phases at the production, the composition should preferably be reflected by the following relation:

% Cr+4.1·% Mo+1.4·% Ni−6.9·% N<55; and in particular by the following relation:

% Cr+0.9·% Mn+4.5·% Mo−12.9·% N<35

In order to further improve the conditions for attaining a sufficient nitrogen solubility in the melt at the AOD production, preferably the following condition is fulfilled:

4.5·% Cr+2·% Mn+1.1·% Mo−% Ni>114.

The invention is additionally illustrated in connection with the following Example which is to be considered as illustrative of the present invention. It should be understood, however, that the invention is not limited to the specific details of the Example.

EXAMPLE

A number of test charges were provided by casting ingots of 170 kg which were hot-forged and extruded to bars, whereof material for most of the corrosion tests also were cold-rolled before solution heat treatment.

Table 1 shows the composition of the test charges in % by weight.

TABLE 1

| Steel | Charge | C | Si | Mn | Cr | Ni | Mo | N |
|---|---|---|---|---|---|---|---|---|
| 1 | 654604 | 0.015 | 0.18 | 7.07 | 30.94 | 6.56 | 1.95 | 0.37 |
| 2 | 654593 | 0.016 | 0.20 | 6.12 | 30.46 | 8.08 | 1.55 | 0.28 |
| 3 (invention) | 654594 | 0.017 | 0.22 | 1.13 | 30.42 | 9.92 | 1.26 | 0.18 |
| 4 | 654617 | 0.015 | 0.23 | 8.00 | 29.14 | 6.56 | 1.03 | 0.27 |
| 5 | 654597 | 0.016 | 0.19 | 5.87 | 29.01 | 8.89 | 1.96 | 0.18 |
| 6 (invention) | 654598 | 0.015 | 0.21 | 1.09 | 29.31 | 6.08 | 1.56 | 0.38 |
| 7 | 654600 | 0.015 | 0.22 | 8.19 | 27.46 | 7.47 | 1.34 | 0.18 |
| 8 | 654601 | 0.021 | 0.22 | 6.04 | 27.65 | 4.07 | 1.01 | 0.38 |
| 9 (invention) | 654602 | 0.015 | 0.22 | 1.16 | 27.50 | 6.70 | 2.02 | 0.28 |
| 10 (invention) | 654605 | 0.015 | 0.27 | 1.02 | 29.03 | 8.86 | 1.06 | 0.19 |
| 11 | 654606 | 0.017 | 0.23 | 7.45 | 29.61 | 5.24 | 1.52 | 0.37 |
| 12 | 654611 | 0.015 | 0.19 | 7.46 | 30.77 | 6.35 | 1.55 | 0.36 |
| 13 | 654614 | 0.015 | 0.20 | 1.70 | 28.81 | 9.17 | 1.07 | 0.13 |
| 14 | 654596 | 0.017 | 0.22 | 8.00 | 28.85 | 7.10 | 1.95 | 0.28 |

The alloys 1–9 were provided according to the principle for statistical test planning (STP), whereby Cr, Mn, Mo and N were varied in a systematic way, which gives information about the influence of the above mentioned four elements upon the different result parameters. The ferrite content was held within the range 40–60% for all the alloys by balancing with Ni.

All steels which are not identified as being part of the invention are for comparative purposes.

Mechanical Properties

The mechanical properties of the materials were found good. One example is given in Table 2, where the mechanical properties of alloy no. 10 are presented.

TABLE 2

| Alloy | Yield point in tension Rp 0.2 (MPa) | Ultimate strength Rm (MPa) | A5 % | Impact strength (J/cm$^2$) 20° C. | Impact strength (J/cm$^2$) −50° C. | Vickers hardness HV10 |
|---|---|---|---|---|---|---|
| 10 | 471 | 715 | 37 | 260 | 260 | 250 |

It is clear from this table that the material has a good ductility, which is illustrated by the high value on rupture extension (A5). The material also has a good impact strength, also at low temperatures. The reversion temperature is lower than −50° C.

Structural Stability

It is very important that the alloy be sufficiently structure-stable in order to be capable of being produced and welded without any precipitation of intermetallic phase or nitrides. The high N content in the alloy makes the material, in spite of its high alloying level, to manage the requirements on structural stability. The reason for this is that the nitrogen suppresses the formation of intermetallic phase, at the same time as nitrogen redistributes Cr and Mo from the ferrite to the austenite.

Table 3 shows the influence of the full annealing procedure on the structure of some test charges, the heating temperature being 150° C./min., the full annealing temperature 1020° C., the holding time 3 min., with varying cooling rates. The share of intermetallic phase was measured by pit counting.

TABLE 3

| Alloy | Cooling temperature (°C./min) | Amount of Intermetallic Phase (%) |
|---|---|---|
| 3 | 140 | 0 |
| 3 | 17.5 | 46 |
| 10 | 17.5 | 0 |
| 13 | 17.5 | 28 |

Obviously, alloy 13 is more sensitive to precipitations than alloy 10. which depends on the fact that the nitrogen content is lower in alloy 13. Alloy 3 manages a cooling rate of 140° C./min without any precipitation of intermetallic phase, but not 17.5° C./min. The reason for this is that the nitrogen content is too low at the higher Cr content in this alloy to be equally structure-stable as alloy 10. However, alloy 3 is producible since the cooling rate of 140° C./min. corresponds to the lowest feasible cooling rate at the manufacturing.

Corrosion Testing

Huey testing according to ASTM A262, practice C, is an established method for measuring the resistance of alloys in oxidizing environments and for testing if the material has been heat-treated in a correct way. Possible precipitations, e.g. chromium carbides in the grain borders, increases the corrosion rate of Huey testing. Materials for urea environments are often delivered to specifications requiring low corrosion rates at Huey testing, and are primarily considered to give a view of the material's behavior in oxidizing process environments. Table 4 shows the corrosion rate at Huey testing of the alloys in solution heat treated condition (1040° C./20 min/H$_2$O).

TABLE 4

Huey testing of alloys in solution heat treated condition.

| Alloy | Corrosion (mm/yr) |
|---|---|
| 1 | 0.060 |
| 2 | 0.060 |
| 3 | 0.050 |
| 4 | 0.070 |
| 5 | 0.055 |
| 6 | 0.075 |
| 7 | 0.080 |
| 8 | 0.090 |
| 9 | 0.070 |
| 10 | 0.060 |
| 11 | 0.070 |
| 12 | 0.065 |
| 13 | 0.060 |
| 14 | 0.070 |

The alloys 19 may be used for calculating the influence of Cr, Mn, N and Mo on the corrosion rate at Huey testing. FIGS. 1–4 show graphically the influence of the elements. The following relation is obtained.

Corrosion (ram/year)=0.285−0.0080% Cr−0.0080% Mo+0.0007% Mn+0.065% N.

A beneficial effect of Cr and Mo on the resistance at Huey testing and a detrimental effect of Mn and N are clear from this formula. The effect of N is explained by the fact that N redistributes Cr from the ferrite to the austenite, which means that the Cr content decreases in the ferrite, wherefore the corrosion rate increases. Surprising is the fact that Mo is beneficial for the resistance in the Huey testing. It has been previously known that Mo increases the corrosion at Huey testing. Obviously this is not the case for duplex steels with high Cr and N contents.

Similar to Huey testing, Streicher testing according to ASTM A262 practice B is a method that tests the resistance of the materials in oxidizing environments. FIGS. 5–8 show graphically the influence of the elements. Of these diagrams it is clear that Cr is very beneficial for the resistance, Mo somewhat beneficial, while N and Mn are detrimental.

The resistance against local corrosion, such as pitting, crevice corrosion and stress corrosion, is important for the material being capable of being used in for instance heat exchanges, where high chloride contents may cause problems. Generally, duplex stainless steels have a very high resistance towards stress corrosion, which is explained by the ferritic austenitic structure per se, but also by the very good passivity of these steels.

Pitting is often a problem for stainless steels, which the present invention has managed to overcome to large extent. Measuring of the critical pitting temperature (CPT) according to the modified standard ASTM G48 A, where the temperature is increased in intervals of 5° C. until pitting arises, is a common method for testing corrosion resistance in sea water. The temperature at which pitting start, may be seen below in Table 5. In this table the critical pitting temperature (CPT) is given in 6-percent $FeCl_3$.

TABLE 5

| Alloy | CPT (°C.) |
|---|---|
| 4 | 45 |
| 10 | 60 |
| 13 | 45 |

The higher N content of alloy 10 gives a better pitting resistance than that of alloy 13. Alloy 4 has a worse resistance than alloy 10 because of a higher Mn content. Mn can lower the pitting resistance because easily soluble manganese sulfides are formed.

Figure 9:
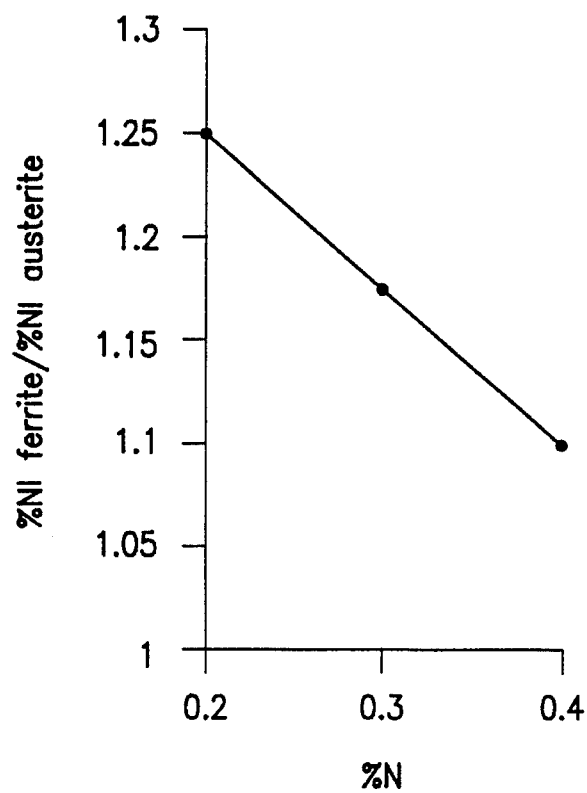
FIG. 9 shows the influence of N on the distribution coefficient % $Cr\alpha$/% $Cr\gamma$.
Figure 10:
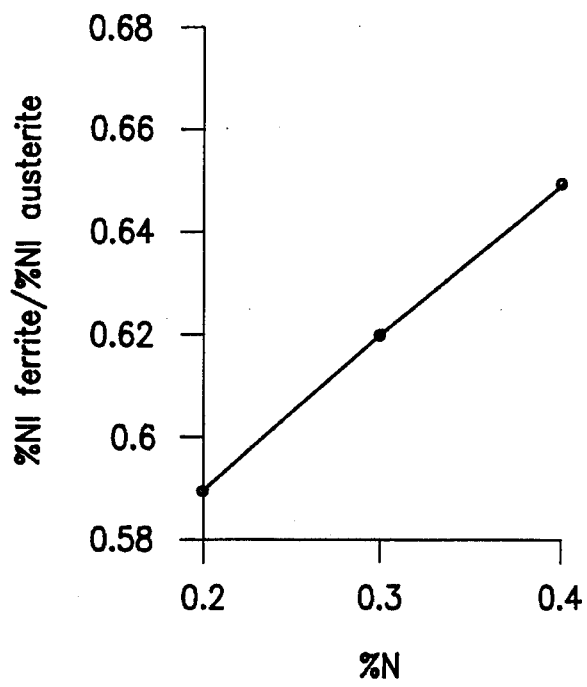
FIG. 10 shows the influence of N on the distribution coefficient % $Ni\alpha$/% $Ni\gamma$.

The balancing of the included elements according to the present invention has been done very carefully in order to attain a good structural stability, good mechanical properties and high corrosion resistance. FIG. 9 shows the influence of N on the distribution of Cr in the ferrite (Crα) and Cr in the austenite (Crγ). It can be seen that Cr is transferred from the ferrite to the austenite at increased N content. FIG. 10 shows the influence on the distribution of Ni between the ferrite (Niα) and the distribution of Ni between the ferrite (Niα) and the austenite (Niγ). Surprisingly it has been shown that Ni is transferred from the austenite to the ferrite at increasing N content.

Table 6 shows the phase composition of two alloys according to the invention, the phase compositions being expressed in % by weight.

TABLE 6

| Alloy | Cr | Ni | Mo | N |
|---|---|---|---|---|
| 3 (ferrite) | 34.7 | 7.0 | 1.75 | <0.05 |
| 3 (austenite) | 27.5 | 12.17 | 1.13 | 0.28 |
| 3 (total) | 30.42 | 9.92 | 1.26 | 0.18 |
| 6 (ferrite) | 31.69 | 4.53 | 2.16 | <0.05 |
| 6 (austenite) | 29.10 | 7.02 | 1.49 | 0.52 |
| 6 (total) | 29.31 | 6.08 | 1.56 | 0.38 |

It can be seen that a high N content gives a high Cr content in the austenite at the same time as the Ni content is low.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A stainless steel alloy having a ferrite-austenite duplex microstructure containing, in % by weight:
—C max. 0.05
—Si max. 0.8
—Mn 0.3–4
—Cr 28–35
—Ni 3–10
—Mo 1.0–3.0
—N 0.30–0.55
—Cu max. 1.0
—W max. 2.0
—S max 0.010
—Ce 0–0.2

—the amount of Cr and N being such that (% Cr and 15 (% N))>33, the amount of Cr, Mn, Mo, and N being such that (% Cr+0.91(% Mn)+4.5(% Mo)−12.9(% N))<35, the amount of Cr in an austenite phase being at least 27% by weight, the remainder being Fe and normally occurring impurities, the ferrite content being 30–70% by volume, balance austenite.

2. The steel alloy of claim 1, wherein the C content is 0.03% max.

3. The steel alloy of claim 2, wherein the C content is 0.02% max.

4. The steel alloy of claim 1, wherein the Si content is 0.5% max. b.w.

5. The steel alloy of claim 1, wherein the Cr content is between 29 and 33% by weight.

6. The steel alloy of claim 1, wherein the Ni content is between 3 and 7% by weight.

7. The steel alloy of claim 1, wherein the Mo content is between 1.0 and 2.0% by weight.

8. The steel alloy of claim 1, wherein the N content is between 0.36 and 0.55% by weight.

9. The steel alloy of claim 1, wherein the Mn content is between 0.3 and 1% by weight.

10. The steel alloy of claim 1, wherein the ferrite content is between 30 and 55% by volume, balance austenite.

11. In the production of urea including the use of stainless steel components for high-pressure components subject to contact with urea or its precursors, the improvement wherein at least a portion of the components are made of the alloy of claim 1.

12. In the improvement of claim 11, wherein at least one of the components stripper tubes, ferrules, condensation tubes, welded-on material and high pressure tubes in urea plants is made of the alloy of claim 1.

13. In the use of construction materials as process chemistry components to be used in nitric acid environments, the improvement wherein at least a portion of the components is made of the alloy of claim 1.

14. In the paper and pulp industry where steel components are used in contact with corrosive chemicals, the improvement wherein at least one of the steel components is made of the alloy of claim 1.

15. Welding wire comprising a steel alloy of claim 1.

* * * * *